(12) United States Patent
Slegelis et al.

(10) Patent No.: US 10,005,437 B2
(45) Date of Patent: Jun. 26, 2018

(54) MACHINE SUSPENSION SYSTEM (71) Applicant: Briggs & Stratton Corporation, Wauwatosa, WI (US)

(72) Inventors: Eric R. Slegelis, Port Washington, WI (US); Travis Rasch, Hutisford, WI (US)

(73) Assignee: Briggs & Stratton Corporation, Wauwatosa, WI (US)

(*) Notice: Subject to any disclaimer, the term of this patent is extended or adjusted under 35 U.S.C. 154(b) by 31 days.

(21) Appl. No.: 15/150,485

(22) Filed: May 10, 2016

(65) Prior Publication Data
US 2017/0113721 A1  Apr. 27, 2017

Related U.S. Application Data (60) Provisional application No. 62/131,738, filed on Mar. 11, 2015.

(51) Int. Cl.
| | |
|---|---|
| *B60K 17/00* | (2006.01) |
| *B60T 7/10* | (2006.01) |
| *F02B 61/00* | (2006.01) |
| *A01D 34/64* | (2006.01) |
| *B60T 1/06* | (2006.01) |
| *B60T 11/04* | (2006.01) |
| *F02B 75/00* | (2006.01) |
| *A01D 101/00* | (2006.01) |
| *F16D 125/60* | (2012.01) |

(52) U.S. Cl.
CPC ............ *B60T 7/10* (2013.01); *A01D 34/64* (2013.01); *B60T 1/062* (2013.01); *B60T 7/102* (2013.01); *B60T 11/046* (2013.01); *F02B 61/00* (2013.01); *F02B 75/007* (2013.01); *A01D 2101/00* (2013.01); *F16D 2125/60* (2013.01)

(58) Field of Classification Search
CPC ......... B62D 11/06; F02B 61/00; A01D 34/64; A01D 2101/00; B60T 1/062; B60T 7/10
USPC ................ 180/53.6, 53.61, 53.62, 53.7, 357; 280/124.109
See application file for complete search history.

(56) References Cited

U.S. PATENT DOCUMENTS 4,553,381 A * 11/1985 Sonnenberg ......... A01D 45/008
56/14.2
5,353,580 A * 10/1994 Wolff ................... A01D 34/661
56/15.2

(Continued)

*Primary Examiner* — Toan To
(74) *Attorney, Agent, or Firm* — Rathe Lindenbaum LLP (57) ABSTRACT

A machine includes a prime mover having a power take-off, a chassis configured to support at least an operator and the prime mover, a subframe pivotally coupled to the chassis about a pivot axis at a first location, at least one drive device configured to drive wheels of the machine, a drive belt and pulley arrangement. The subframe is further coupled to the chassis via at least one suspension device at a second location. The at least one drive device is driven by the prime mover and is coupled to the subframe. The pulley arrangement is configured to direct the drive belt from the power take-off of the prime mover to at least one drive pulley on the at least one drive device. The pulley arrangement comprises an idler pulley having a diameter and a rotational axis. The idler pulley is coupled to the chassis such that the rotational axis is spaced from the pivot axis by no greater than 1.5 times the diameter.

20 Claims, 13 Drawing Sheets

(56) References Cited

U.S. PATENT DOCUMENTS

| | | | | |
|---|---|---|---|---|
| 7,503,161 B1 * | 3/2009 | Mizukawa | ............ | A01D 34/71 56/14.7 |
| 2003/0000191 A1 * | 1/2003 | Papke | .................... | A01D 34/76 56/10.8 |
| 2007/0209457 A1 * | 9/2007 | Irikura | ................. | B60K 17/105 74/15.8 |
| 2009/0241702 A1 * | 10/2009 | Osuga | ................. | B60K 17/105 74/11 |

* cited by examiner

MACHINE SUSPENSION SYSTEM

CROSS-REFERENCE TO RELATED PATENT APPLICATIONS

The present application is a US non-provisional patent application claiming priority under 35 USC 119 from U.S. Provisional Patent Application Ser. No. 62/131,738 filed on Mar. 11, 2015 by Slegelis et al. and entitled ZERO-TURN RADIUS LAWNMOWER WITH SUSPENSION SYSTEM, the full disclosure of which is hereby incorporated by reference.

BACKGROUND

The present invention relates to a suspension system used on machines such as lawn and garden equipment, such as zero-turn radius (ZTR) mowers. Typically, ZTR mowers comprise unsuspended right and left drive wheels operably coupled to a mower frame, with at least one front caster wheel also coupled to the mower frame. However, independently-suspended right and left drive wheels for ZTR mowers have been shown in U.S. Pat. No. 5,946,893, U.S. Pat. No. 6,062,333, U.S. Pat. No. 6,170,242, U.S. Pat. No. 6,244,025, U.S. Pat. No. 6,460,318, U.S. Pat. No. 6,510,678, U.S. Pat. No. 6,857,254, and U.S. Pat. No. 7,107,746, each of which is incorporated herein by reference. These patents show several variations of independently-suspended right and left drive wheels for ZTR mowers, each embodiment including a prime mover such as an internal combustion engine, a hydraulic pump for each respective drive wheel being operably coupled to the internal combustion engine, and a hydraulic motor for each respective drive wheel being operably coupled to the respective hydraulic pumps. Both the internal combustion engine and the respective hydraulic pumps are connected to the frame of the ZTR mower in an unsuspended manner, wherein the hydraulic pumps are mechanically coupled and driven by the internal combustion engine via, for example, a belt-and-pulley system. The hydraulic pumps are then coupled to the respective hydraulic wheel motors via a series of hoses, wherein the hydraulic wheel motors are mounted on a suspension platform to allow for independent suspension of each of the drive wheels. The delivery of hydraulic fluid from the hydraulic pumps to the hydraulic wheel motors enables zero-turn radius drive capabilities, as is known in the art.

Recently, the use of hydrostatic transmissions known as hydrostatic transaxles has become prevalent in the ZTR mower industry. Hydrostatic transaxles combine the hydraulic pump and hydraulic wheel motor into a single unit, thereby simplifying and reducing the overall cost of the drive system of ZTR mowers and other hydraulically-driven devices. Typically, two hydrostatic transaxles are used, one for each drive wheel of the ZTR mower. Similar to the system described above, the hydraulic pump of the hydraulic transaxle is mechanically driven by an internal combustion engine (or similar drive unit) via a belt-and-pulley system, and the hydraulic pump in turn drives the hydraulic motor for each drive wheel. However, due to the integration of the hydraulic pump and hydraulic wheel motor into a single unit, suspension of the drive wheels on a ZTR mower utilizing hydrostatic transaxles presents several challenges. Foremost of those challenges is the variation in belt angle between the drive pulley coupled to the output shaft of the internal combustion engine and the driven pulley(s) of the hydraulic pump on the hydrostatic transaxle. If the belt angle between the drive and driven pulley(s) is too great, the belt may run off of one or more the pulleys and render the drive system inoperable. These challenges were addressed in the ZTR mower suspension system shown in commonly-owned U.S. Pub. 2013/0291508, incorporated herein by reference. However, the system shown in that publication was directed to a larger, commercial-style ZTR mower, wherein the engine (and thus power take-off) positioning was significantly behind the hydrostatic transaxles, thereby enabling the system's pulleys to be located on a suspended subframe without significant variations in belt angle that would potentially cause the belt to "jump" or run off of one or more pulleys. The component-placement advantages of this larger machine would not necessarily be present in a smaller ZTR mower.

DETAILED DESCRIPTION OF EXAMPLES

Figure 1:
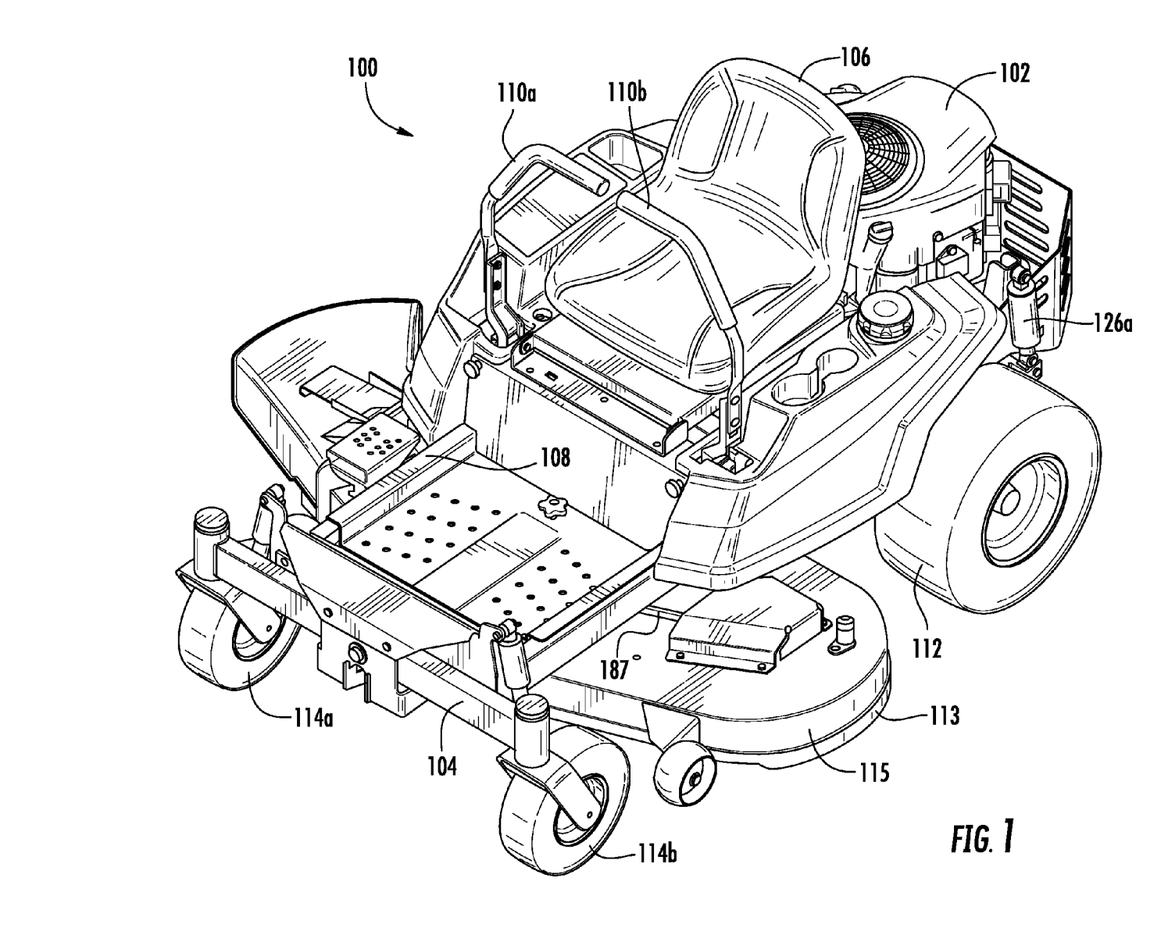
FIG. 1 is an isometric view of an example machine having an example suspension system.

FIG. 1 illustrates of an example machine, an example piece of lawn and garden equipment, shown as a zero turn radius (ZTR) lawnmower 100. ZTR mower 100 of FIG. 1 comprises a prime mover 102, such as an air-cooled internal combustion engine, electric motor, etc., wherein prime mover 102 is supported on a chassis 104. An operator seat 106 is coupled to chassis 104 forward of prime mover 102, enabling an operator to control ZTR lawnmower 100 while seated in seat 106 and having their feet placed on footplate 108. Two control levers 110a, 110b are configured to be pivotally actuated by the operator to enable forward movement, reverse movement, and turning of ZTR lawnmower 100, as is well known in the art.

Control levers 110a, 110b are coupled to respective hydrostatic transaxles (not shown) to power respective right and left drive wheels 112. In lieu of hydrostatic transaxles, drive via independent pump and wheel motors or independent electric drive motors is also possible. Additionally, it is possible for a single transmission (hydraulic or otherwise) to drive both right and left drive wheels 112. Two front caster wheels 114a, 114b allow the mower be easily maneuvered in a zero turn radius fashion. In the example illustrated in which the illustrated machine comprises a lawnmower, a mower deck 113 is hung from chassis 104, wherein the mower deck supports one or more mowing blades 115 powered by prime mover 102.

Figure 2:
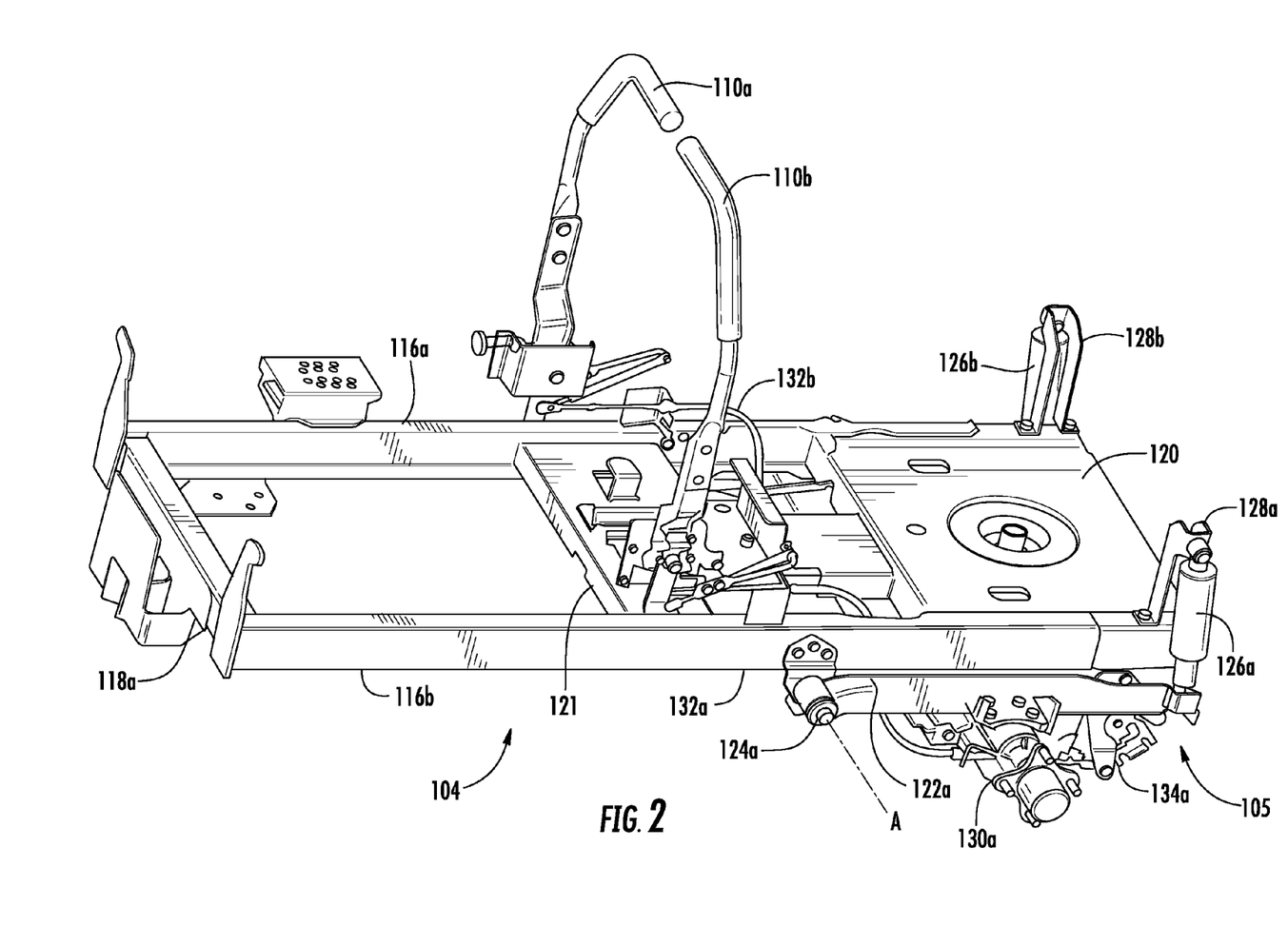
FIG. 2 is a perspective view of select machine and suspension components.
Figure 3:
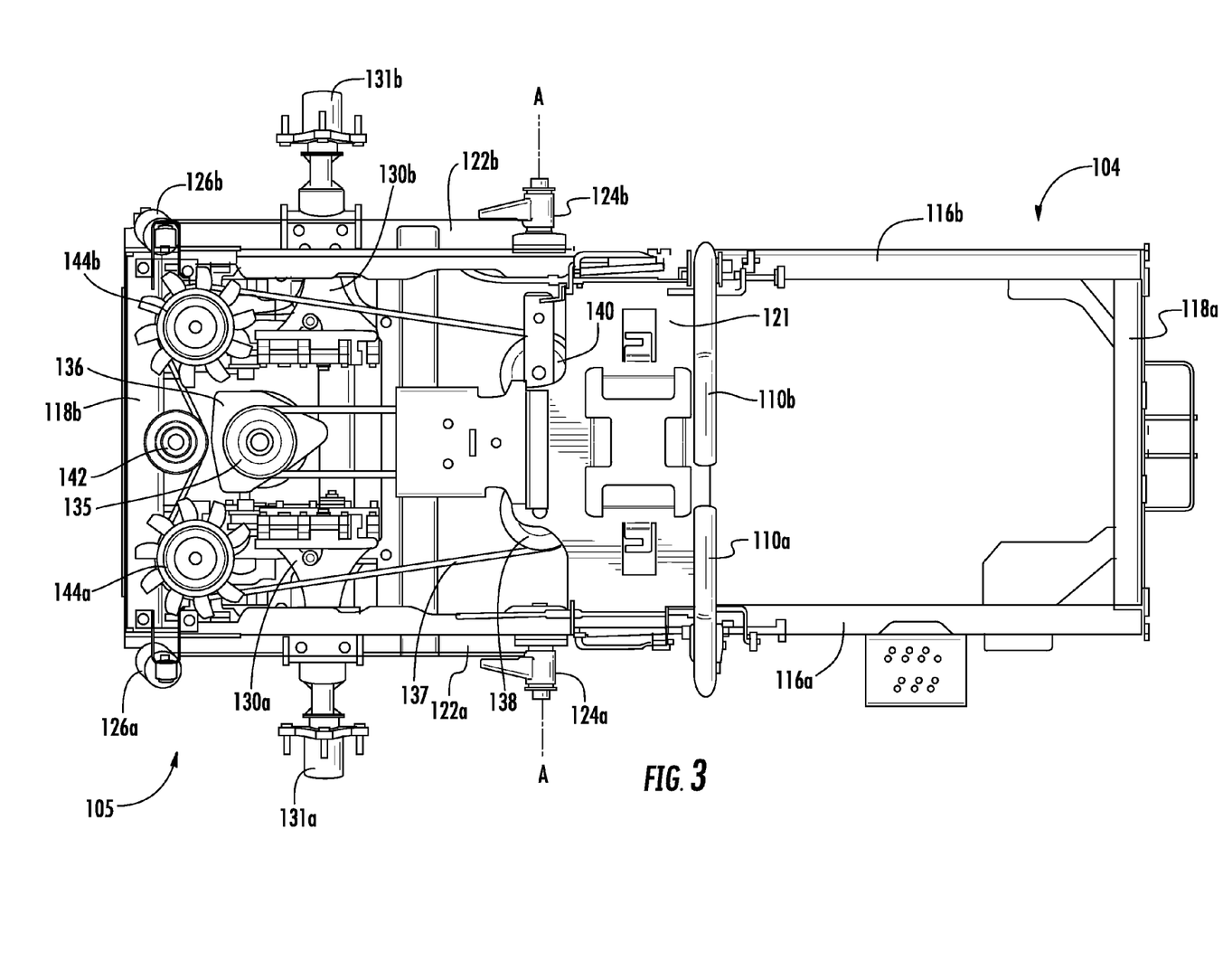
FIG. 3 is a top view of select machine and suspension components.

FIGS. 2-3 are partial views of various components of ZTR mower 100. As shown by FIGS. 2 and 3, chassis 104 comprises two longitudinal support beams 116a, 116b, a front cross beam 118a, and a central plate 121 coupled to respective longitudinal support beams 116a, 116b. Chassis 104 also comprises a prime mover mounting plate 120 upon which prime mover 102 is coupled. Additionally, a suspended subframe 105 is pivotally mounted to chassis 104 about a pivot axis A at respective pivot points 124a, 124b. Suspended platform 105 supports thereon integrated hydrostatic transaxles 130a, 130b, which integrally contain both a hydraulic pump and a hydraulic motor therein for driving drive wheels 112. Control cables 132a, 132b for each control lever 110a, 110b are coupled to bell cranks 134a, 134b on respective hydrostatic transaxles 130a, 130b, which enables forward and reverse control of transaxles 130a, 130b in a manner known in the art. While cables 132a, 132b are shown, it is also possible for the connection between control levers 110a, 110b and hydrostatic transaxles 130a, 130b to be via other types of suitable linkages.

Suspended subframe 105 comprises longitudinal support beams 122a, 122b, wherein the distal ends of longitudinal support beams 122a, 122b are coupled to respective suspension devices 126a, 126b. Suspension devices 126a, 126b could be any suitable suspension mechanism such as a coil-over-shock device, a dampener, etc. Suspension devices 126a, 126b are also coupled to respective supports 128a, 128b mounted on longitudinal support beams 116a, 116b of chassis 104. With this configuration, subframe 105 is pivotally suspended from chassis 104 about pivot axis A such that drive wheels 112 are capable of substantially vertical translation as ZTR mower 100 moves over rough terrain, etc. FIG. 2 shows subframe 105 in a substantially compressed position, but it is to be understood that subframe 105 may typically be at angled at various positions with respect to chassis 104 originating at pivot points 124a, 124b, generally dependent upon the presence of an operator, condition of the terrain, etc. As hydrostatic transaxles 130a, 130b are coupled to subframe 105, they too are capable of vertical translation about pivot axis A. Conversely, because prime mover 102 is affixed to mounting plate 120 on chassis 104, prime mover 102 does not move in concert with suspended subframe 105.

FIG. 3 is a top view of various example ZTR mower components. As discussed above with respect to FIG. 2, suspended subframe 105 pivots about a pivot axis A from chassis 104. Respective longitudinal support beams 122a, 122b of subframe 105 act to at least partially support hydrostatic transaxles 130a, 130b (collectively referred to as transaxles 130), which are coupled to drive wheels through respective wheel hubs 131a, 131b. In order to transfer power from a prime mover (not shown) to the respective hydrostatic transaxles 130a, 130b, an engine drive pulley 135 is coupled to a power take-off (PTO) shaft of the prime mover and connected via a belt 137 using a pulley arrangement to be discussed in further detail below. A PTO clutch 136 is also coupled to the PTO shaft of the prime mover to drive the blades 108 of a mower deck 104 coupled to chassis 104 via a separate belt (also not shown). Belt 137 could be any suitable drive belt, but is preferably a double-A or double-V-type belt to allow the belt to drive pulleys on both its inside and outside surfaces.

Figure 4:
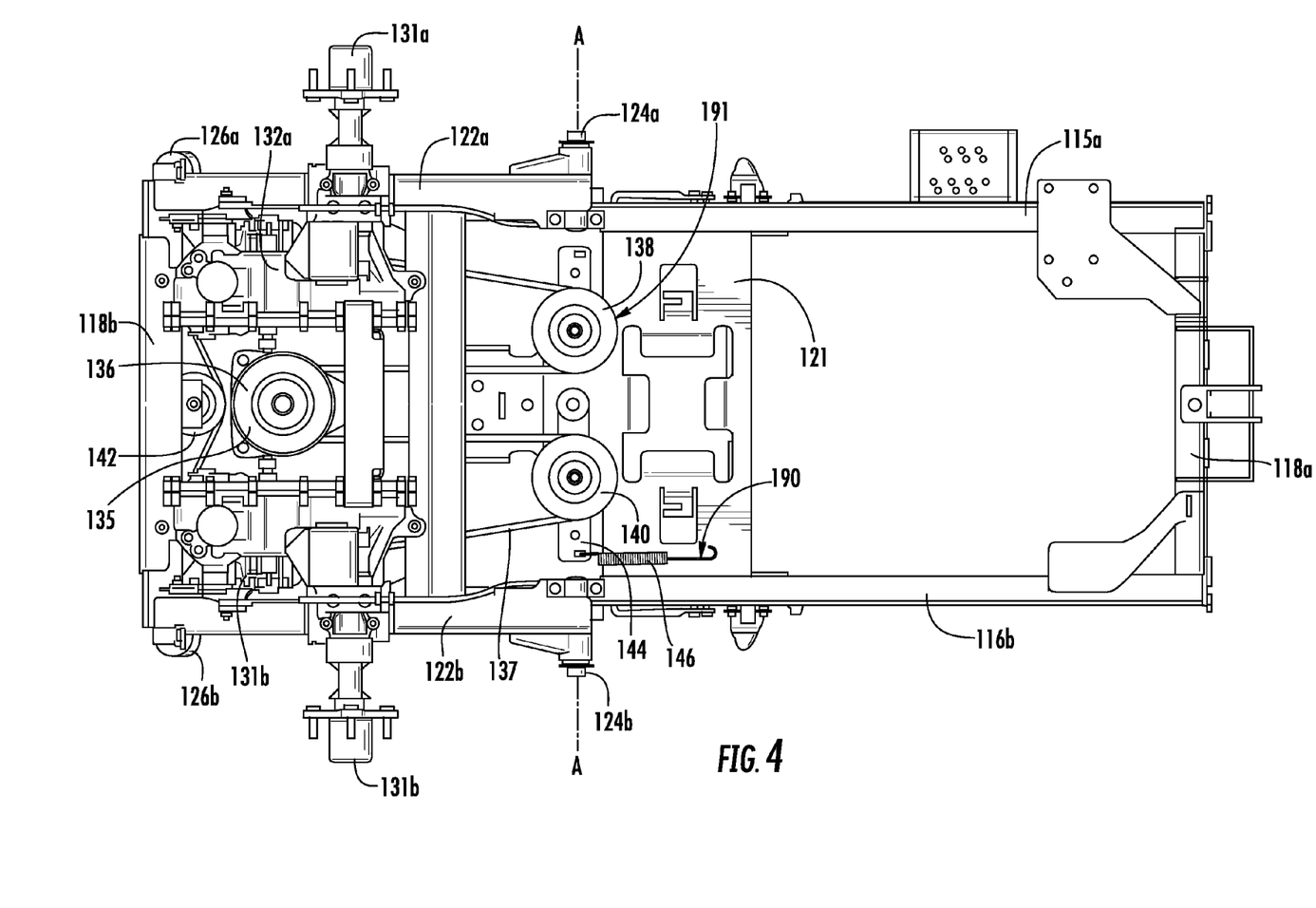
FIG. 4 is a top perspective view of a portion of the example machine and suspension of FIG. 1.
Figure 5:
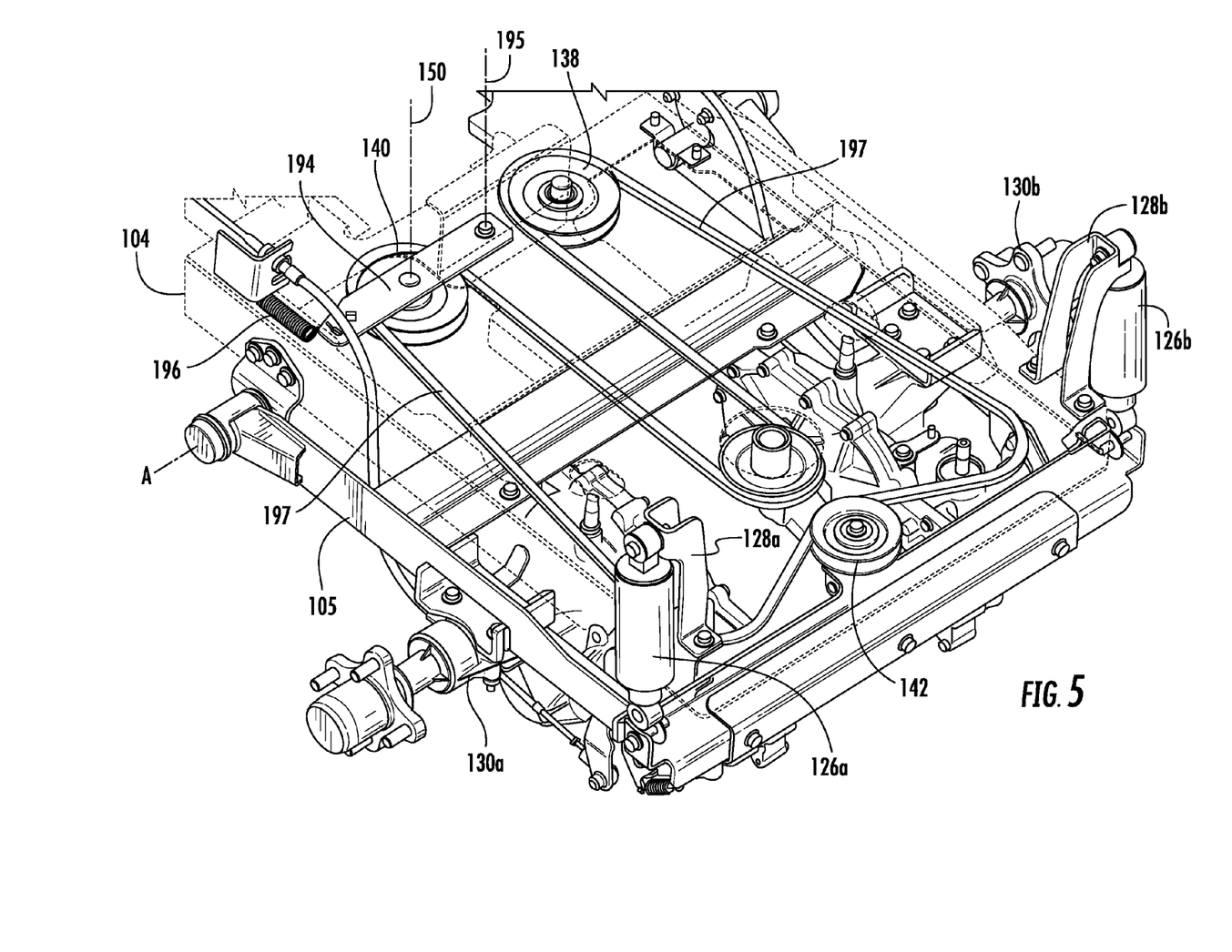
FIG. 5 is a rear perspective view of a portion of the example machine and suspension of FIG. 1.

FIGS. 4 and 5 illustrate an example pulley arrangement 141 that guides and directs belt 137 so as to drive each of hydrostatic transaxles 130. Pulley arrangement comprises idler pulleys 138, 140, 142 and drive pulleys 144a, 144b. Belt 137 runs from PTO clutch 136 to idler pulleys 138, 140, wherein idler pulleys 138, 140 are mounted on central plate 121 of chassis 104. Accordingly, idler pulleys 138, 140 do not pivot about pivot axis A or otherwise move with vertical translation of suspended subframe 105. From idler pulleys 138, 140, belt 137 runs to drive pulleys 144a, 144b on respective hydrostatic transaxles 130a, 130b in order to enable hydraulic drive of the transaxles 130a, 130b. Idler pulley 142 is coupled to a rear cross beam 118b of subframe 105 to maintain tension and provide sufficient belt-wrap of belt 137 around drive pulleys 144a, 144b.

As mentioned above, idler pulleys 138, 140 are mounted on central plate 121 of chassis 104, while drive pulleys 144a, 144b are coupled to hydrostatic transaxles 130a, 130b, meaning drive pulleys 144a, 144b also move in concert with any translation of suspended subframe 105. As idler pulleys 138, 140 are stationary (i.e., do not pivot with respect to pivot axis A) and drive pulleys 144a, 144b move with suspended subframe 105, the angle of belt 137 between these sets of pulleys changes with the various the suspension conditions of subframe 105. Accordingly, proper placement of idler pulleys 138, 140 is important to avoid significant changes in belt angle during operation of the mower, as such significant changes may cause belt 137 to "jump" during operation and disengage belt 137 from the drive system.

Figure 6:
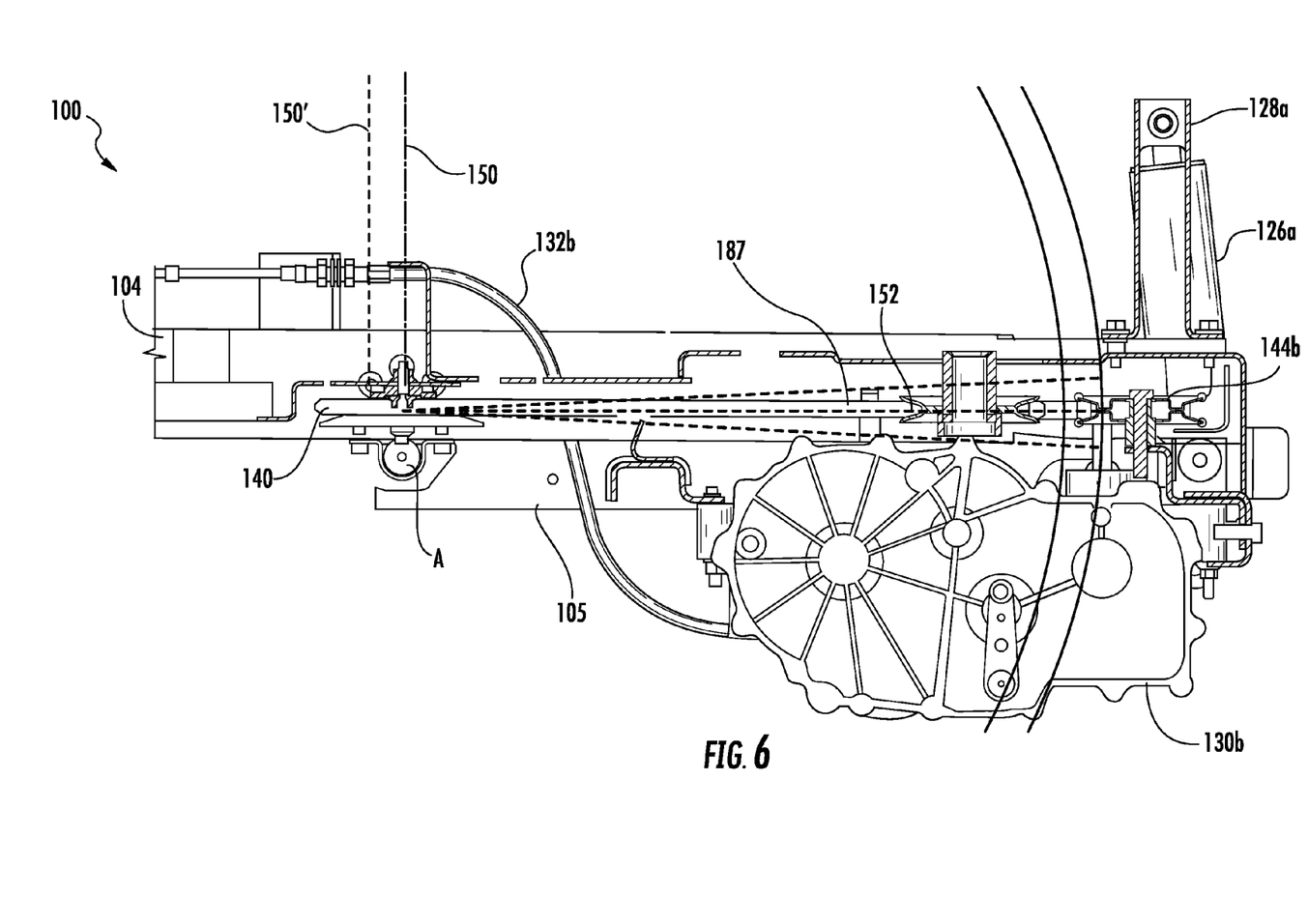
FIG. 6 is a sectional view of a portion of an example machine and suspension of FIG. 1.
Figure 7:
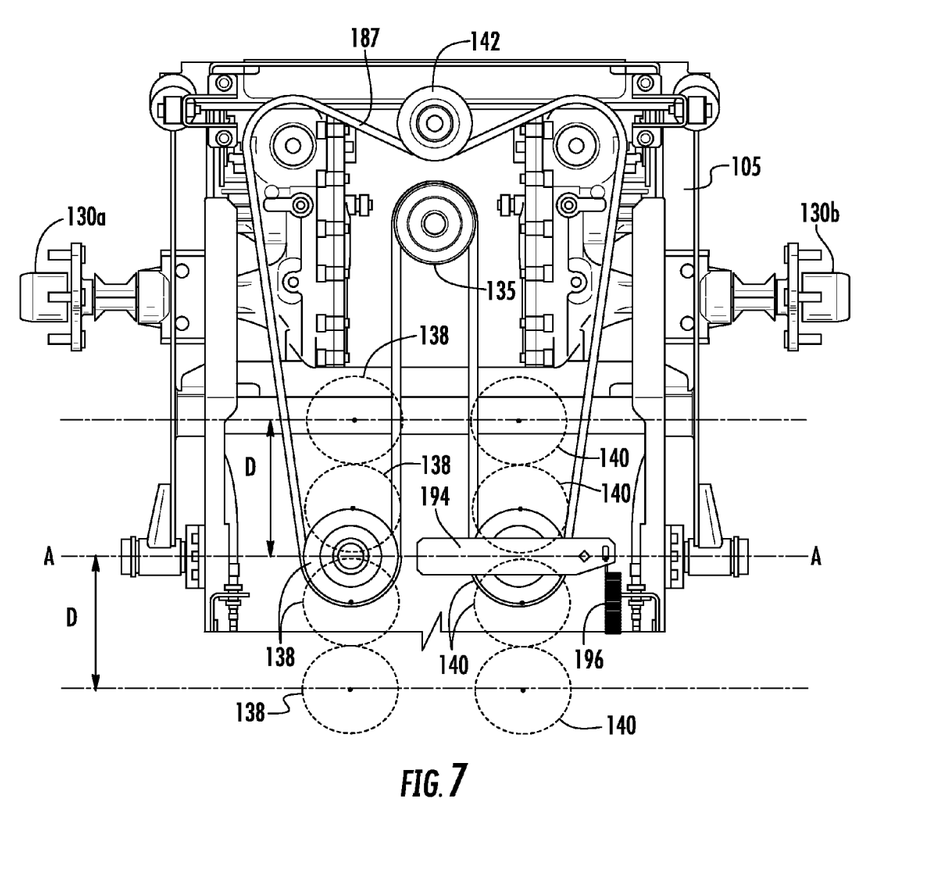
FIG. 7 is a bottom view of a portion of the example machine and suspension of FIG. 1 illustrating various alternative idler pulley positions.
Figure 8:
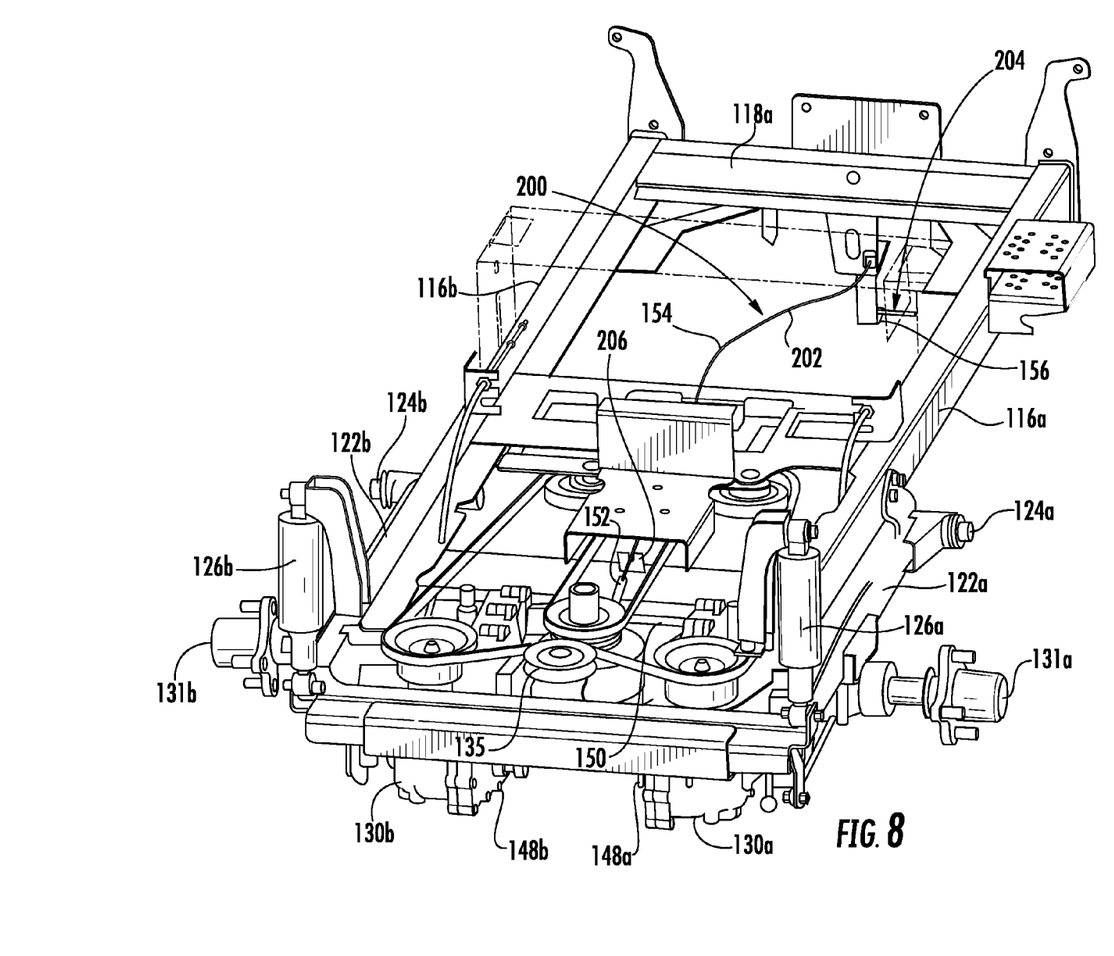
FIG. 8 is a top front perspective view illustrating an example parking brake system of the example machine of 1.
Figure 9:
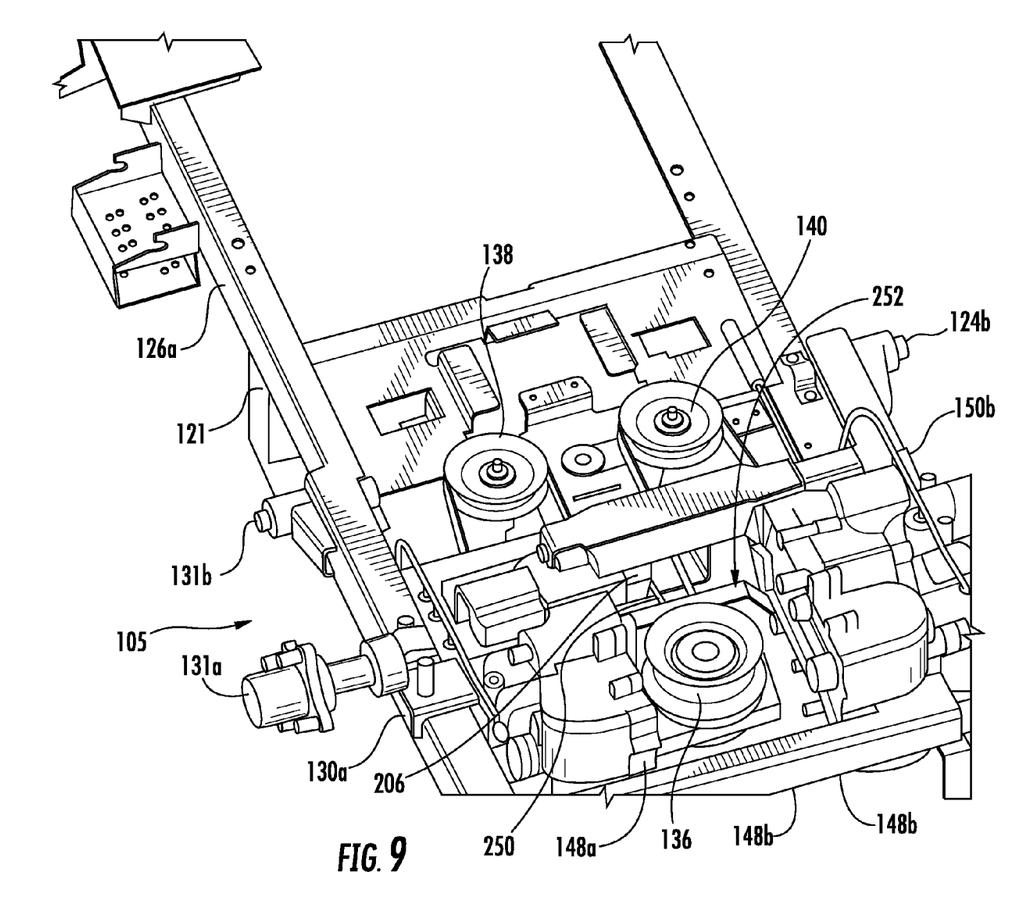
FIG. 9 is a top rear perspective view illustrating the example parking brake system.
Figure 10:
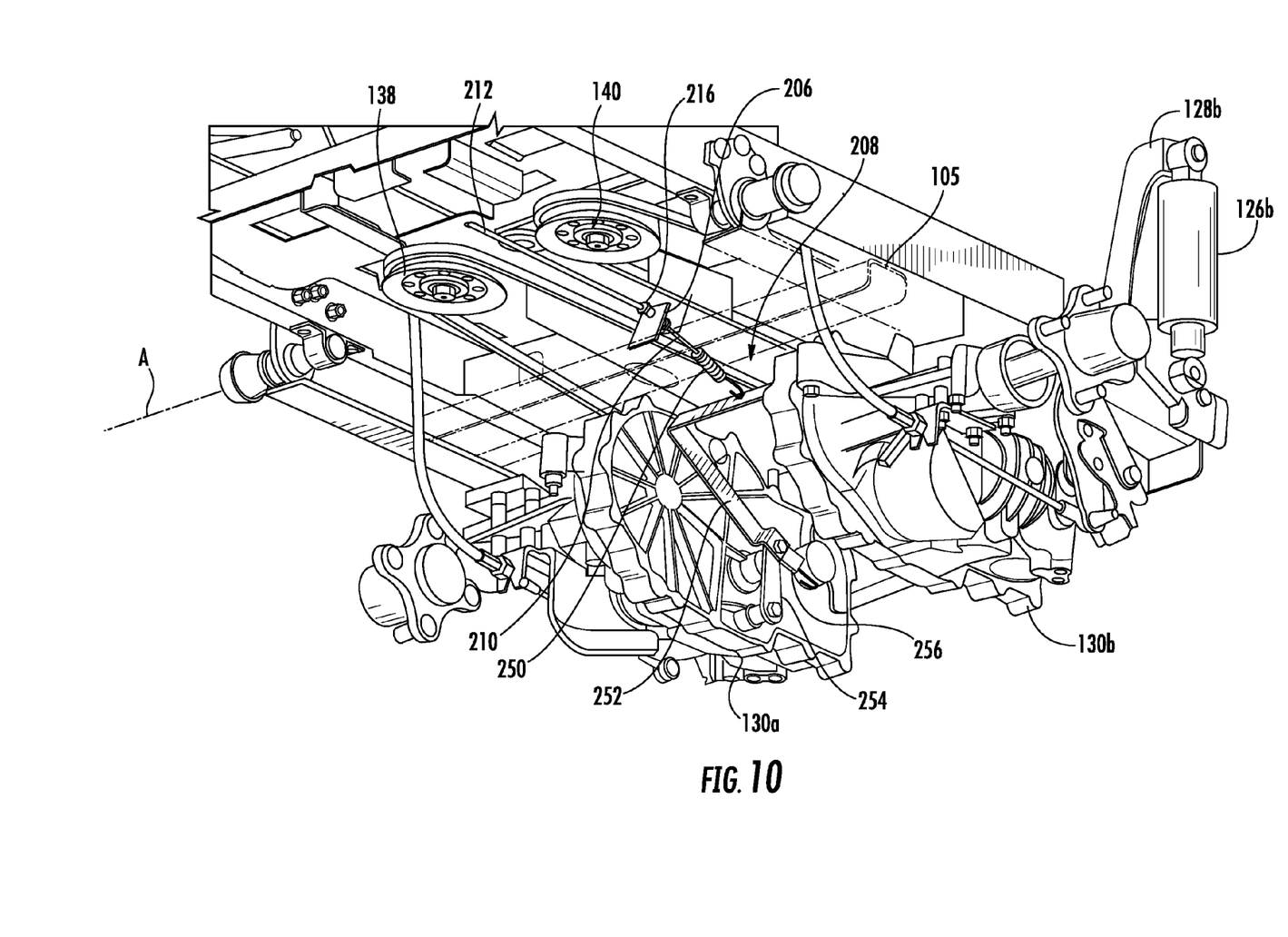
FIG. 10 is a bottom perspective view illustrating the example parking brake system.

FIGS. 6 and 7 illustrate examples for the placement of idler pulleys 138, 140. As shown by FIG. 6, in one implementation, the rotational axes 150 of idler pulleys 138, 140 are perpendicular to and substantially in line with pivot axis A of suspended subframe 105. For the purposes of this embodiment, idler pulleys 138, 140 being "substantially" in line with the pivot axis A may mean that the pulleys are directly in line with pivot axis A (with no perceivable offset, intersecting pivot axis A), within one pulley diameter forward of pivot axis A, or a greater distance forward of pivot axis A within the confines of chassis 104.

In the example illustrated in FIG. 6, axes 150 of idler pulleys 138, 140 are directly in line with pivot axis A, intersecting pivot axis A. As a result, as indicated by radius lines 152, the belt angle between idler pulleys 138, 140 and drive pulleys 144a, 144b is as small as possible, regardless of the suspension condition of subframe 105. In other words, the length of belt 137 insubstantially changes or does not change in response to the pivoting of subframe 105. Because the length of belt 137 does not change despite the pivoting of subframe 105, the risk of belt 105 jumping and becoming disengaged from any of the pulleys of the pulley arrangement 141 is reduced.

FIG. 7 is a top view of portions of mower 100 illustrating alternative positions for idler pulleys 138, 140. In other implementations, the rotational axes 150 of idler pulleys 138, 140 may be spaced, forwardly or rearwardly, from pivot axis A by a distance D of up to 1.5 times the diameter of at least one of idler pulleys 138, 140. In such implementations, the length of belt may more substantially change as subframe 105 pivots, possibly requiring more robust and complex belt take up assemblies.

In some implementations, idler pulleys 138, 140 may alternatively be set slightly closer to the front of the mower (i.e., in the direction of control levers 110a, 110b. For example, in one implementation, idler pulleys 138, 140 may have rotational axes 150' which are located less than or equal to 1 inch of pivot axis A as shown in FIG. 6. In other implementations, idler pulleys 138, 140 may be positioned a distance of one pulley diameter forward of pivot axis A without substantial changing the complexity of the system. As illustrating FIG. 7, in some implementations, idler pulleys 138, 140 may be positioned even further forward of pivot axis A (by greater than one pulley diameter) depending on the overall layout of the mower and intervening components, but this again may add to the complexity of the belt take-up assembly.

FIGS. 4 and 5 illustrate one example belt take-up assembly 190 for taking up slack in belt 187 that may result from the pivoting of subframe 105 about pivot axis A. Belt take-up assembly 190 helps maintains belt tension on the system (i.e., "take-up"). In the example illustrated, belt take up assembly 190 comprises a movable support that movably supports the rotational axis of at least one of idler pulleys 138, 140 for movement between different positions to relocate the rotational axis and a bias mechanism resiliently biasing the idler pulley towards a predefined position for the rotational axis. In the example illustrated, the movable support comprises an idler arm 194 having a first end portion pivotally coupled to chassis 104 for pivotal movement about axis 195, a central portion rotatably supporting the idler pulley, idler pulley 140 for rotation about axis 150 and a second end portion resiliently biased towards a preset a predefined position. In the example illustrated, the bias mechanism comprises a tension spring 196 interconnecting the second end portion of arm 194 and chassis 104. During pivoting of subframe 105, spring 196 stretches or constricts as the rotational axis pulley 140 changes to accommodate the change in the length of segments or strands 197 of belt 187, extending between the idler pulleys 138, 140 and the drive pulleys 144a and 144b. In other implementations, belt take up assembly 190 may have other configurations.

Figure 11:
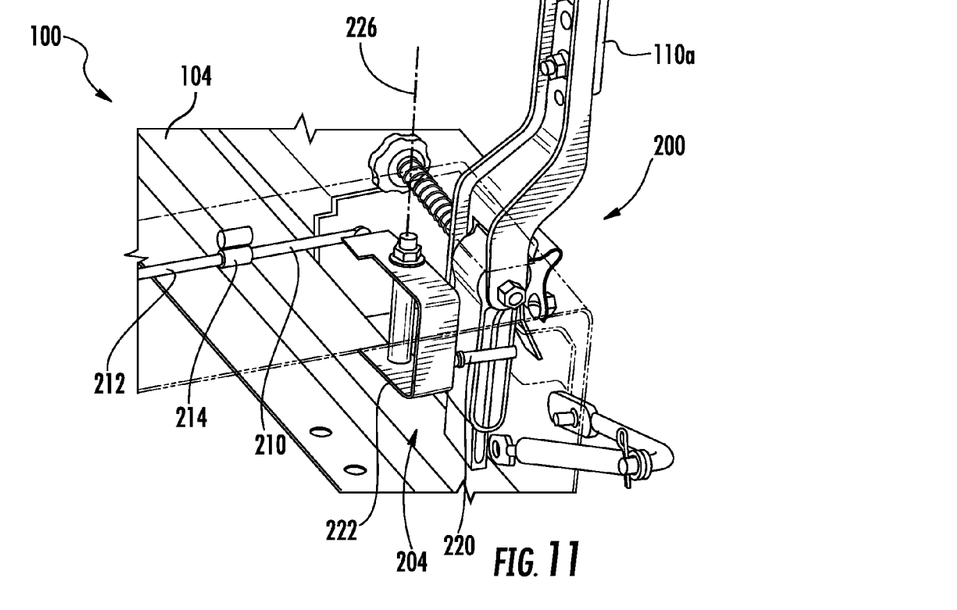
FIG. 11 is a fragmentary perspective view of a portion of the parking brake system in a brake disengaged position.

FIGS. 8-13 illustrate an example parking brake system 200 for mower 100. Parking brake system 200 is configured to brake wheels 112 when the mower 100 is in a parked or stopped position. Parking brake system 200 comprises flexible cable 202, control arm interface 204, cable mount 206 and brake interface 208. Flexible cable 202 extends between control arm 110a (shown in FIGS. 1-3) and each of hydrostatic transaxles 130 so as to transmit motion of control arm 110a to an internally located braking mechanism within each of hydrostatic transaxles 130. In the example illustrated, flexible cable 202 comprises a Bowden cable, a cable comprising an inner flexible cable 210 and an outer guiding sheath 212 (shown in FIG. 12). The inner flexible cable 210 is connected to the control arm interface 204 and the brake interface 208 at opposite ends, wherein the inner flexible cable is pushed and pulled through, long and relative to the outer flexible sheath 212. The outer flexible sheath 212 has a first end 214 (as shown in FIG. 11) fixedly coupled to chassis 104 proximate to control arm interface 204 and a second end 216 fixedly coupled to cable mount 206 supported by subframe 105. The outer flexible sheath 212 has sufficient slack between its ends such that the outer flexible sheath may accommodate movement of cable mount 206 resulting from pivotal movement of suspension 105

FIG. 11 illustrates control arm interface 204 in more detail. Control arm interface 204 comprises rod 220 and bell crank bracket 222. Rod 220 is coupled between control arm 110a and bell crank bracket 222. In one implementation, rod 220 is affixed at one end to control arm 110a and a second end to bell crank bracket 222.

Figure 12:
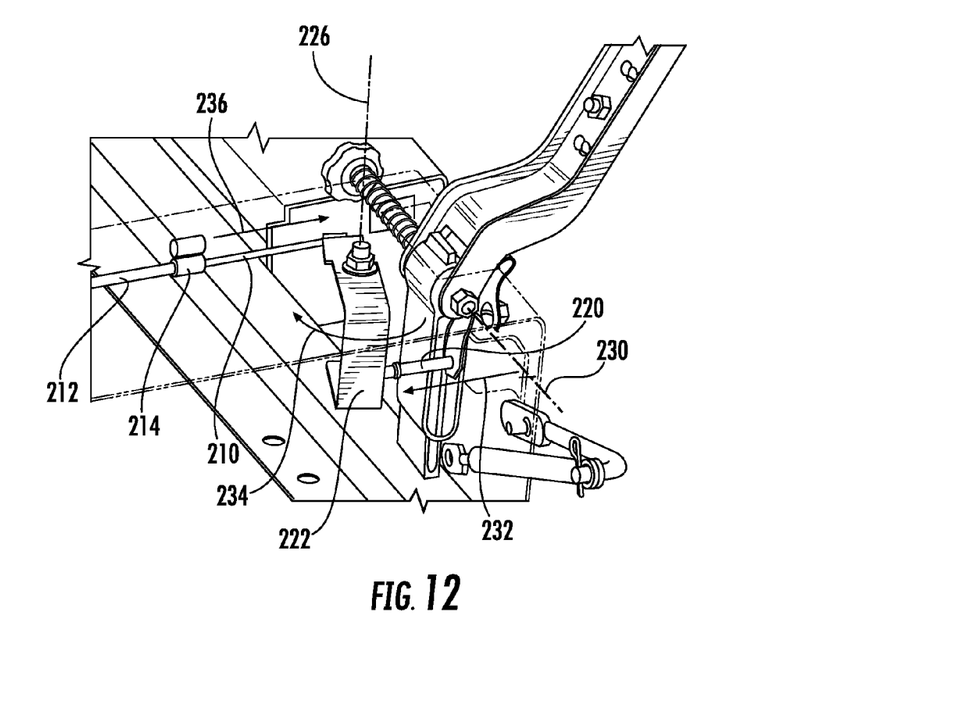
FIG. 12 is a fragmentary perspective view of the portion of the parking brake system in a brake engaged position.
Figure 13:
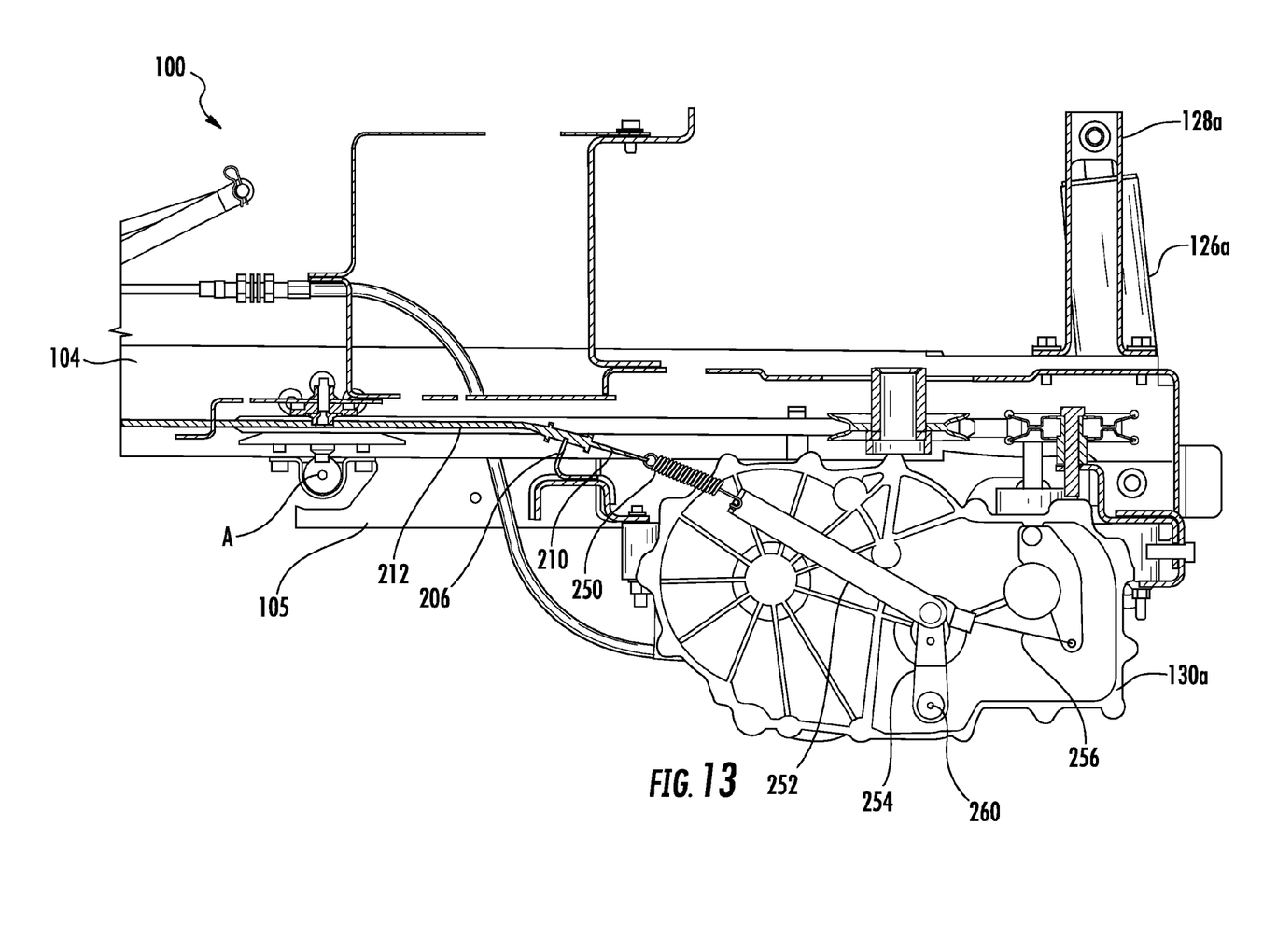
FIG. 13 is a sectional view of the example machine illustrating parking brake system components.

Bell crank bracket 222 comprises a bracket pivotably coupled to chassis 104 for rotation about axis 226. Bracket 222 is connected to rod 220 on a first side of axis 226 and is connected to flexible cable 210 on a second side of axis 226. As shown by FIG. 12, pivoting of control arm 110a outwards, about axis 230 drives rod 220 in the direction indicated by arrow 232 which results in bell crank bracket 222 being rotated in the direction indicated by arrow 234. Rotation of bell crank bracket 222 in the direction indicated by arrow 234 results in cable 210 being pulled through and relative to sheath 212 in the direction indicated by arrow 236. Such motion is transmitted through an along sheath 212 to brake interface 208.

Cable mount 206 comprises a structure affixed to and carried by subframe 105 so as to pivot with subframe 105. Cable mount 206 secures end 216 of sheath 212 to subframe 105. Cable mount 206 ensures that the sheath about flexible cable 210 also moves with the pivoting of subframe 105, wherein the actual length of the flexible cable 210 within sheath 212 does not change.

Brake interface 208 comprises one or more structures interconnecting flexible cable 216. Brake interface 208 comprises spring 250, bracket 252, lever 254 and bias 256. Spring 250 comprises a tension spring connected between cable 210 and bracket 252. Spring 250 exerts a bias through flexible cable 210 to bell crank bracket 222, opposing outward pivoting of control arm 110a. Spring 250 further transmits motion of cable 210 to bracket 252.

Bracket 252 comprises a non-flexible frame or member that interconnects spring 250 and lever 254. Bracket 252 further interconnects spring 250 to a second lever 254 associated with the other hydrostatic transaxle 131b. In the example illustrated, bracket 252 comprises an inflexible or rigid U-shaped frame having opposing spaced legs extending on opposite sides of PTO clutch 136 and connected to each of the levers 254 of the two hydrostatic transaxles 131. In other implementations, bracket 252 may have other configurations.

Lever 254 comprises a rigid brake engaging member pivotally connected to bracket 252 at one end and connected to a shaft or rod that rotates about axis 260 and that extends into the respective transaxle 130a, 130b to an internal cog or other component (not shown) within transaxles 130a, 130b when in the "park" position to prevent rotation of the drive wheels. Spring 256 comprise a tension spring having one end connected to or affixed relative to an outer housing of the respective transaxle 130 and having another end connected to lever 254 to bias lever 254 to a predefined position, such as a position in which the internal brake of the transaxle 130 is disengaged. In other implementations, other mechanisms may be utilized to bias lever 254 to a predefined position.

Due to the suspended nature of subframe 105, it is important that U-shaped frame forming the nonflexible frame of bracket 252 remain stationary relative to transaxles 130a, 130b unless actuated by the user to apply the parking brake. Accordingly, while flexible cable 210 may move with corresponding pivotal movement of subframe 105, spring 250 and U-shaped frame forming the nonflexible frame of bracket 252 are mounted only to components of subframe 105 such that translation of the suspension system alone does not move levers 254 and inadvertently actuate the cogs or other components within transaxles 130a, 130b to actuate the brake while the mower is moving.

Figure 14:
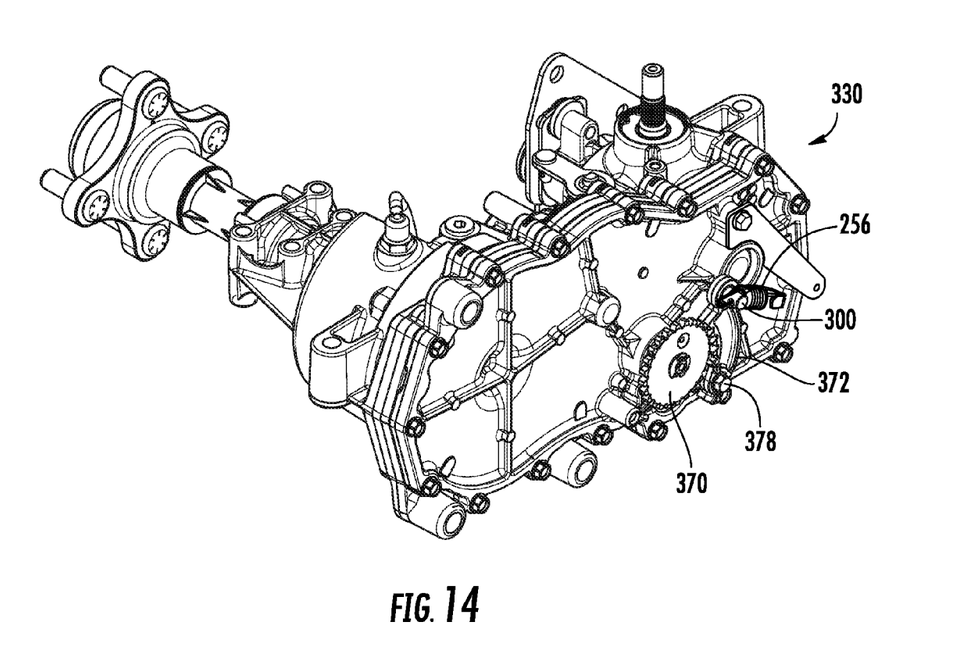
FIG. 14 is a perspective view of another example hydrostatic transaxle and associated portions of another example parking brake system.

FIG. 14 illustrates hydrostatic transaxle 330, an alternative implementation of hydrostatic transaxle 130a or 130b. Transaxle 330 is similar to transaxle 130 except that transaxle 330 has an external braking mechanism comprising gear 370 and brake 372. Gear 370 is affixed to a shaft and operably coupled to the output shaft of transaxle 330 and wheel 112. Brake 372 comprises a curved toothed brake engagement member pivotable about axis 378 between a gear engaging, braking position and a withdrawn, brake disengaged position. In such an implementation, bracket 252 (shown in FIG. 13) is pivotally connected to brake 372 at connection 380. In one implementation, bracket 252 is pivotally connected to brake 372 at connection 380 for each of the two transaxles 330. Similar to lever 254, brake 372 is resiliently biased towards a withdrawn position by spring 256.

In operation, in response to lever arm 110a being pivoted outward about axis 230 as shown in FIG. 12, flexible cable 210 is pulled to pull up on spring 250. Spring 250 pulls upon bracket 250 which pivots brake 372, against the bias of spring 256, into braking engagement with gear 370. Pivoting of control arm 110a to the inner position shown in FIG. 11 results in bracket 252 pivoting brake 372 about axis 378 away from and out of engagement with brake 370. Such withdrawal to the brake disengaged position is further assisted by the bias of spring 256.

Although the present disclosure has been described with reference to example implementations, workers skilled in the art will recognize that changes may be made in form and detail without departing from the spirit and scope of the claimed subject matter. For example, although the pulley arrangement and the parking brake system are illustrated as being utilized as part of a riding lawnmower such as a zero turn radius mower, in other implementations, we discussed pulley arrangement and parking brake system may be employed and other machines or other pieces of lawn and garden equipment which employ a suspension that carries drive devices that are driven by a prime mover. Although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements.

What is claimed is:

1. A machine comprising:
   a prime mover, the prime mover having a power take-off;
   a chassis, wherein the chassis is configured to support at least an operator and the prime mover;
   a subframe pivotally coupled to the chassis about a pivot axis at a first location, wherein the subframe is further coupled to the chassis via at least one suspension device at a second location;
   at least one drive device configured to drive wheels of the machine, the at least one drive device driven by the prime mover and coupled to the subframe;
   a drive belt; and
   a pulley arrangement configured to direct the drive belt from the power take-off of the prime mover to at least one drive pulley on the at least one drive device, wherein the pulley arrangement comprises an idler pulley having a diameter and a rotational axis and wherein the idler pulley is coupled to the chassis such that the rotational axis is spaced from the pivot axis by no greater than 1.5 times the diameter.

2. The machine of claim 1, wherein the idler pulley is coupled to the chassis such that the rotational axis is spaced from the pivot axis by no greater than the diameter.

3. The machine of claim 1, wherein the idler pulley is coupled to the chassis such that the rotational axis is spaced from the pivot axis by no greater than 6.8 inches.

4. The machine of claim 1, wherein the idler pulley is coupled to the chassis such that the rotational axis is spaced from the pivot axis by no greater than 4.5 inches.

5. The machine of claim 1, wherein an idler pulley is coupled to the chassis such that the rotational axis is spaced from the pivot axis by no greater than 1 inch.

6. The machine of claim 1, wherein the idler pulley is coupled to the chassis such that the rotational axis intersects the pivot axis.

7. The machine of claim 1, wherein machine comprises a lawn mower.

8. The machine of claim 1, wherein the pulley arrangement further comprises a second idler pulley having a second diameter and a second rotational axis and wherein the second idler pulley is coupled to the chassis such that the second rotational axis is spaced from the pivot axis by no greater than 1.5 times the second diameter.

9. The machine of claim 1, wherein the at least one drive device comprises at least one hydrostatic transaxle.

10. The machine of claim 1, wherein the subframe comprises a first longitudinal support beam, a second longitudinal support beam, and a cross beam.

11. The machine of claim 3, wherein the at least one drive device is coupled to at least one of the first longitudinal support beam and the second longitudinal support beam.

12. The machine of claim 1, wherein the prime mover is one of an internal combustion engine and an electric motor.

13. The machine of claim 1, wherein the prime mover is coupled to a plate on the chassis.

14. The machine of claim 1, wherein the idler pulley is movable to reposition the rotational axis and wherein the machine further comprises a bias mechanism resiliently biasing the idler pulley towards a predefined position for the rotational axis.

15. The machine of claim 1, wherein the bias mechanism comprises an idler arm rotationally supporting the idler pulley and tensioning spring coupling the idler arm to the chassis.

16. A machine comprising:
   a prime mover having a power takeoff;
   a chassis, wherein the chassis is configured to support at least an operator and the prime mover;
   a subframe pivotally coupled to the chassis about a pivot axis at a first location, wherein the subframe is further coupled to the chassis via at least one suspension device at a second location;
   at least one drive device configured to drive rear wheels of the machine, the at least one drive device driven by the prime mover and coupled to the subframe;
   a first control lever and a second control lever coupled to the at least one drive device to enable the operator to drive and steer the machine; and
   a parking brake system comprising:
      at least one brake engagement member configured to engage a parking brake on the at least one drive device;

a non-flexible frame coupled to the at least one brake engagement member;

a flexible cable coupled to the non-flexible frame, wherein the nonflexible frame is configured to engage the parking brake on the at least one drive device in response to outward rotation of only one of the first control lever and the second control lever, wherein the non-flexible frame is supported on the subframe so as not to enable brake engagement through pivotal movement of the subframe alone.

17. The machine of claim 16, wherein the flexible cable is part of a Bowden cable having a flexible sheath about the flexible cable, wherein the flexible sheath is affixed to the subframe and pivots with the subframe and wherein the flexible cable extends from the flexible sheath and is coupled to the non-flexible frame.

18. The machine of claim 17 further comprising a spring having a first end connected to the flexible cable and a second end connected to the non-flexible frame.

19. The machine of claim 16 further comprising a mower deck coupled to the chassis and rotationally supporting a mower blade.

20. The machine of claim 16 further comprising:

a drive belt; and a pulley arrangement configured to direct the drive belt from the power take-off of the prime mover to at least one drive pulley on the at least one drive device, wherein the pulley arrangement comprises an idler pulley having a diameter and a rotational axis and wherein the idler pulley is coupled to the chassis such that the rotational axis is spaced from the pivot axis by no greater than 1.5 times the diameter.

* * * * *